US009573196B2

(12) United States Patent
Chang

(10) Patent No.: US 9,573,196 B2
(45) Date of Patent: Feb. 21, 2017

(54) POSITION CONTROLLING DEVICE FOR A CARPENTER ANGLE DRILL/HOLLOW CHISEL MORTISER

(71) Applicant: Wen-Chi Chang, Taichung (TW)

(72) Inventor: Wen-Chi Chang, Taichung (TW)

( * ) Notice: Subject to any disclaimer, the term of this patent is extended or adjusted under 35 U.S.C. 154(b) by 63 days.

(21) Appl. No.: 14/791,125

(22) Filed: Jul. 2, 2015

(65) Prior Publication Data
US 2017/0001246 A1 Jan. 5, 2017

(51) Int. Cl.
B23B 49/00 (2006.01)
B23B 39/00 (2006.01)
H01H 71/08 (2006.01)
B27F 5/02 (2006.01)

(52) U.S. Cl.
CPC .............. *B23B 39/00* (2013.01); *H01H 71/08* (2013.01); *B23B 49/006* (2013.01); *B23B 2260/048* (2013.01); *B23B 2260/062* (2013.01); *B23B 2270/022* (2013.01); *B27F 5/02* (2013.01); *Y10T 408/13* (2015.01); *Y10T 408/18* (2015.01); *Y10T 408/99* (2015.01)

(58) Field of Classification Search
CPC ................. B23B 49/006; B23B 49/003; B23B 2260/048; B23B 2260/0482; B27F 5/02; B27F 5/10; Y10T 408/18; Y10T 408/13; Y10T 408/15; Y10T 408/165; Y10T 408/20
See application file for complete search history.

(56) References Cited

U.S. PATENT DOCUMENTS

| | | | | |
|---|---|---|---|---|
| 1,970,218 A | * | 8/1934 | Bishop | B23G 1/16 408/9 |
| 3,246,546 A | * | 4/1966 | Madden | B23Q 11/0092 408/9 |
| 3,828,383 A | * | 8/1974 | Johnstone | B23Q 5/041 408/9 |
| 5,127,775 A | * | 7/1992 | Broadbent | B23Q 16/00 408/14 |
| 2005/0042053 A1 | * | 2/2005 | Story | B23Q 1/01 409/218 |

* cited by examiner

*Primary Examiner* — Daniel Howell
*Assistant Examiner* — Nicole N Ramos
(74) *Attorney, Agent, or Firm* — Hershkovitz & Associates, PLLC; Abe Hershkovitz

(57) ABSTRACT

A position controlling device for a carpenter angle drill/hollow chisel mortiser has a mounting group, a positioning group, and a retaining arm. The mounting group has two crossbars and a bridge bar. The bridge bar is connected to the crossbars. The positioning group is connected to the mounting group, and has two limiting blocks, a holding frame, and a circuit breaker. The limiting blocks are connected to the bridge bar between the crossbars. The holding frame is securely connected to one of the limiting blocks. The circuit breaker is mounted in the holding frame and has a contacting slice and an electric wire. The contacting slice is elastically connected to the circuit breaker, and transversally extends out of the holding frame. The retaining arm selectively abuts the contacting slice of the circuit breaker to enable the circuit breaker at a turn-off condition.

7 Claims, 8 Drawing Sheets

POSITION CONTROLLING DEVICE FOR A CARPENTER ANGLE DRILL/HOLLOW CHISEL MORTISER

BACKGROUND OF THE INVENTION

1. Field of the Invention

The present invention relates to a position controlling device, and more particularly to a position controlling device for a carpenter angle drill/hollow chisel mortiser that can automatically stop an actuation of the carpenter angle drill when a moving base of the carpenter angle drill moves to a top dead center of the carpenter angle drill.

2. Description of Related Art

A conventional carpenter angle drill/hollow chisel mortiser is used to drill holes in a working piece, and has a base, a mounting stud, a moving head, a drill seat, a motor, an operating lever, and a position controlling device. The mounting stud is securely mounted on the base. The moving head is slidably mounted on a front side of the mounting stud above the base. The drill seat is securely mounted on a bottom of the moving head and has a drill. The motor is mounted on the moving base to drive the drill to rotate.

The operating lever is connected to the mounting stud to make the moving head slide relative to the mounting stud to enable the drill to move closer to or away from the base to drill the working piece. The position controlling device is mounted between the mounting stud and the moving head to provide a stroke of the drill, and has a bridge bar, two limiting blocks and a retaining arm. The bridge bar is mounted on a sidewall of the mounting stud. The limiting blocks are mounted around the bridge bar at an interval, and the interval may be equal to the stroke of the drill. The retaining arm is securely connected to the moving head, movably extends between the limiting blocks, and selectively abuts the limiting blocks.

In use, a user can adjust the stroke of the drill by changing the interval between the limiting blocks according to a thickness of the working piece. Then, the user rotates the operating lever, the drill is moved downwardly with the moving head to drill the working piece, and the drill is stopped to move downwardly when the retaining arm contacts the lower limiting block. After drilling the working piece, the drill is moved upwardly with the moving head and the operating lever and is stopped from moving upwardly when the retaining arm contacts the upper limiting block. Therefore, the stroke of the drill is limited between the limiting blocks since the retaining arm is moved between the limiting blocks.

However, the drill is driven by the motor, and the motor is actuated during the drill operation including a down stroke and an upstroke of the drill, and this means the drill is still rotated when the retaining arm contacts the upper limiting block. Then, the user or other persons may get injured by the rotating drill when completing the drill operation, and this is unsafe in use and will waste energy. In addition, the limiting blocks are only mounted around the bridge bar, and the retaining arm may hit the limiting blocks during the drilling operation to change the positions of the limiting blocks relative to the bridge bar, and this will change the interval between the limiting blocks. Then, the stroke of the drill will be changed and this will influence the processing quality of the conventional carpenter angle drill/hollow chisel mortiser.

To overcome the shortcomings, the present invention provides a position controlling device for a carpenter angle drill/hollow chisel mortiser to mitigate or obviate the aforementioned problems.

SUMMARY OF THE INVENTION

The main objective of the present invention is to provide a position controlling device for a carpenter angle drill/hollow chisel mortiser that can automatically stop an actuation of the carpenter angle drill/hollow chisel mortiser when a moving base of the carpenter angle drill/hollow chisel mortiser moves to a top dead center of the carpenter angle drill/hollow chisel mortiser.

The position controlling device for a carpenter angle drill/hollow chisel mortiser in accordance with the present invention has a mounting group, a positioning group, and a retaining arm. The mounting group has two crossbars and a bridge bar. The bridge bar is connected to the crossbars. The positioning group is connected to the mounting group, and has two limiting blocks, a holding frame, and a circuit breaker. The limiting blocks are connected to the bridge bar between the crossbars. The holding frame is securely connected to one of the limiting blocks. The circuit breaker is mounted in the holding frame and has a contacting slice and an electric wire. The contacting slice is elastically connected to the circuit breaker, and transversally extends out of the holding frame. The retaining arm selectively abuts the contacting slice of the circuit breaker to enable the circuit breaker at a turn-off condition.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
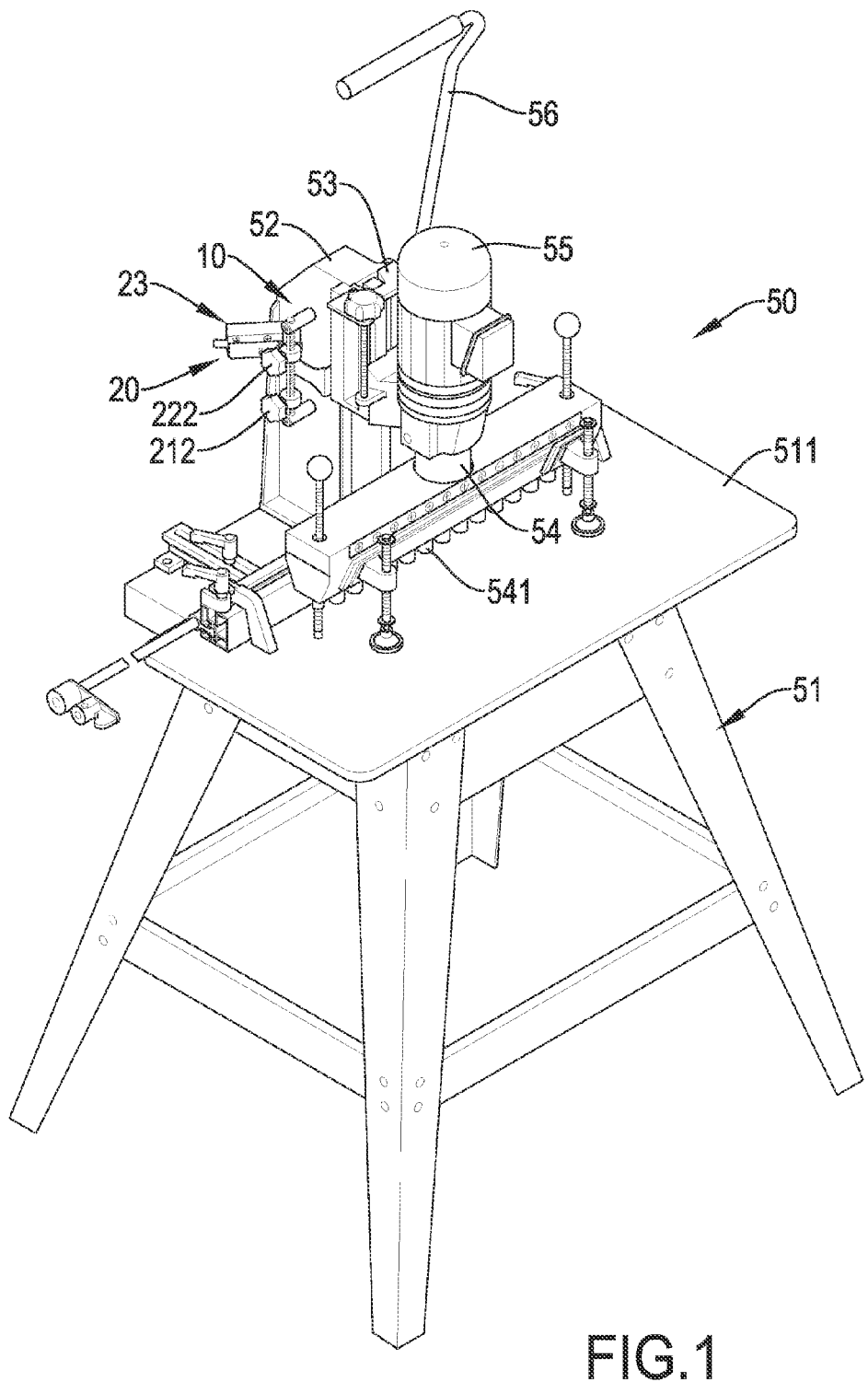
FIG. 1 is a perspective view of a position controlling device in accordance with the present invention, mounted on a carpenter angle drill/hollow chisel mortiser.

With reference to FIG. 1, a position controlling device in accordance with the present invention is mounted on a carpenter angle drill/hollow chisel mortiser 50, and has a mounting group 10, a positioning group 20, and a retaining arm 30.

The carpenter angle drill/hollow chisel mortiser 50 has a base 51, a mounting stud 52, a moving head 53, a drill seat 54, a motor 55, and an operating lever 56. The base 51 has a top face 511. The mounting stud 52 is securely and longitudinally mounted on the top face 511 of the base 51, and has two sidewalls and a front side. The moving head 53 is slidably mounted on the front side of the mounting stud 52 above the top face 511 of the base 51, and has two opposite sides and a front side. The opposite sides of the moving head 53 are respectively and slidably connected to the sidewalls of the mounting stud 52 at the front side of the mounting stud 52.

The drill seat 54 is securely mounted on the front side of the moving head 53, and has a top side, a bottom side, and at least one drill 541. The bottom side of the drill seat 54 faces the top face 511 of the base 51. The at least one drill 541 is rotatably mounted on the bottom side of the drill seat 54 above the top face 511 of the base 51. The motor 55 is securely mounted on the top side of the drill seat 54 behind the front side of the moving head 53 to drive the at least one drill 541. The operating lever 56 is pivotally connected to one of the sidewalls of the mounting stud 52 to make the moving head 53 slide along the front side of the mounting stud 52 to enable the at least one drill 541 to move closer to or away from the top face of the base 51. The structures of and relationships between the mounting stud 52, the moving head 53, and the operating lever 56 are conventional and are not described in detail.

Figure 2:
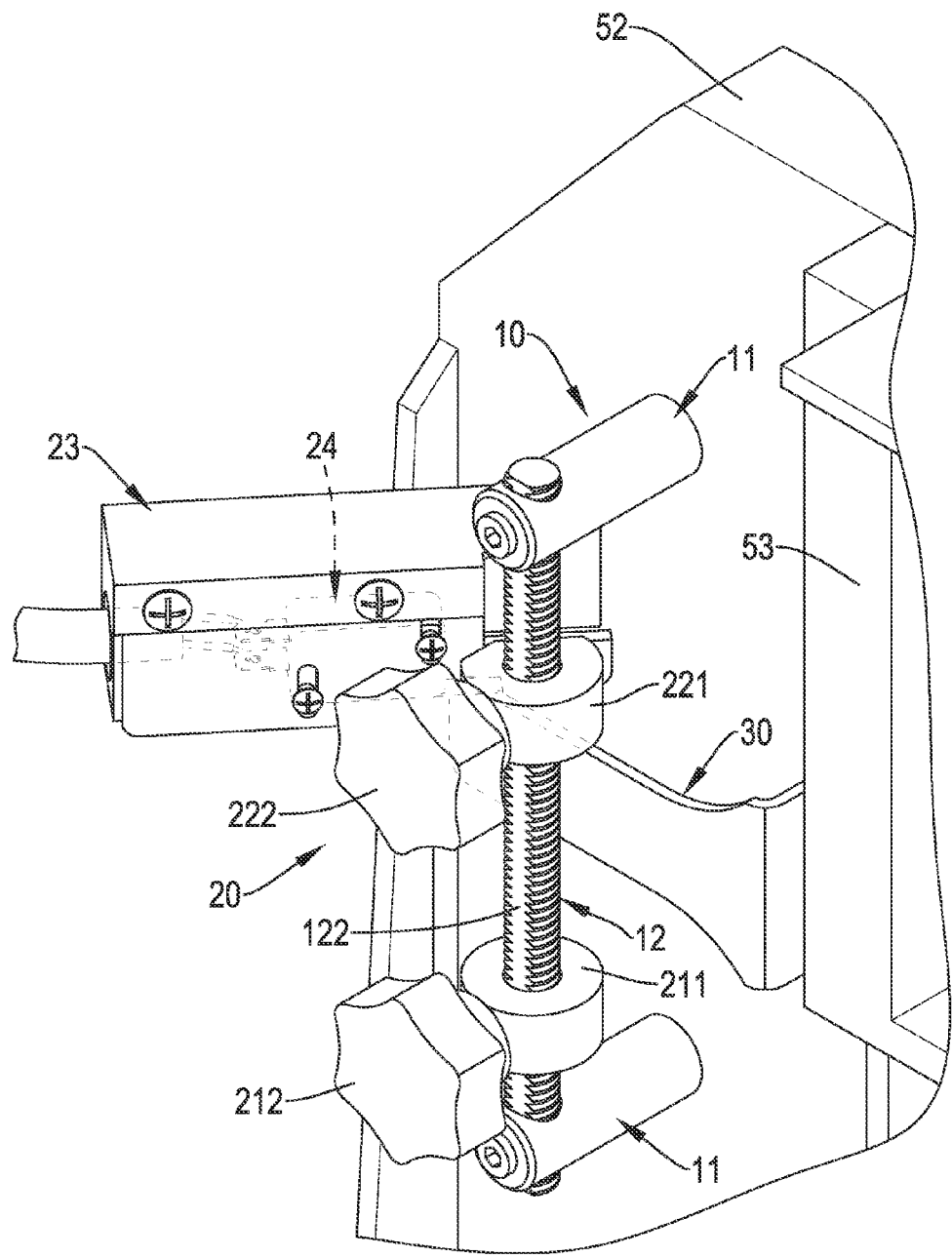
FIG. 2 is an enlarged perspective view of the position controlling device in FIG. 1.
Figure 3:
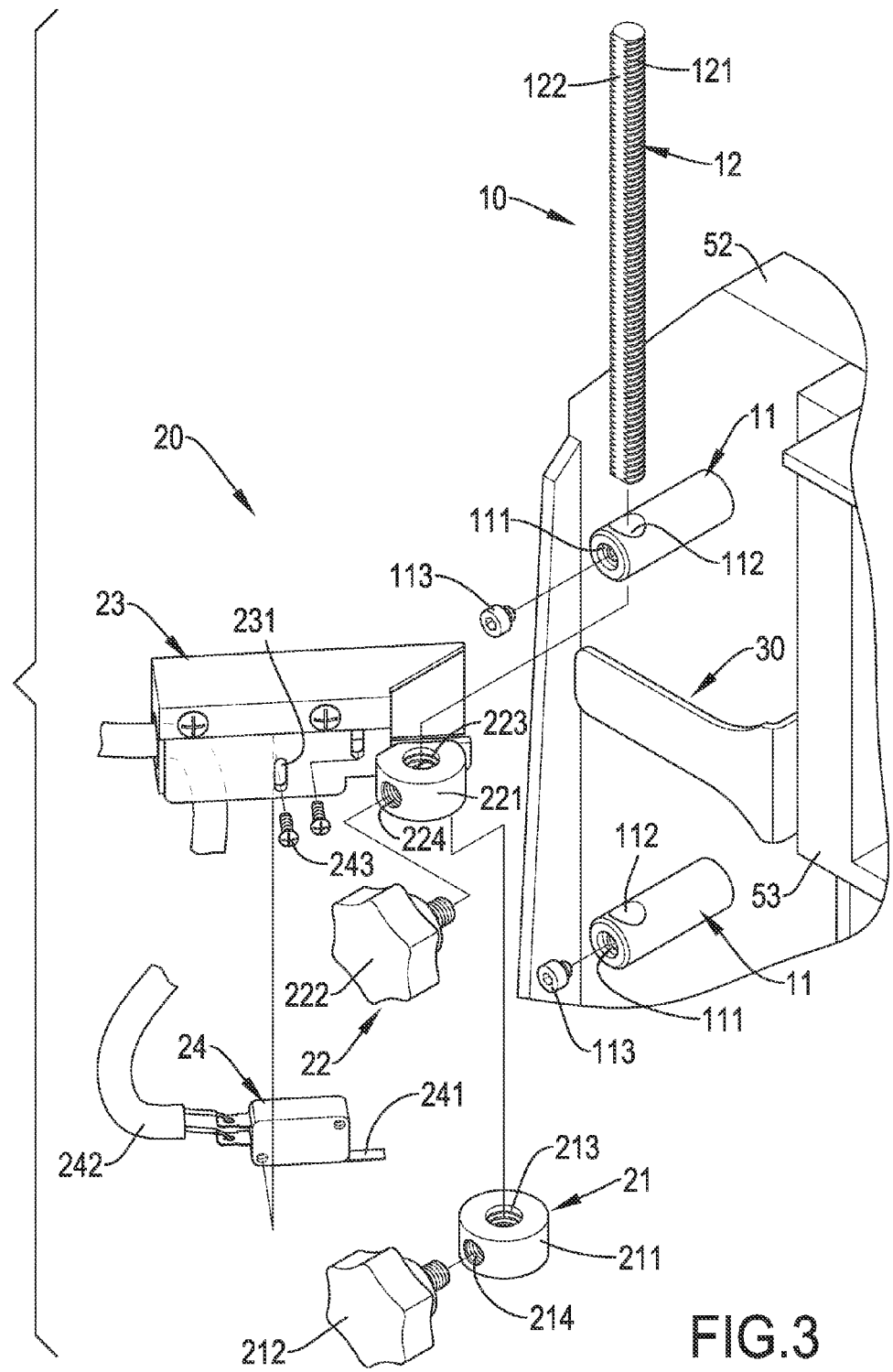
FIG. 3 is an enlarged and exploded perspective view of the position controlling device in FIG. 1.

With reference to FIGS. 2 and 3, the mounting group 10 is securely mounted on the other sidewall of the mounting stud 52 that is opposite to the operating lever 56, and has two crossbars 11 and a bridge bar 12.

The crossbars 11 are transversally and securely mounted on and extend from the corresponding sidewall of the mounting stud 52 at an interval, are opposite to the operating lever 56, and each one of the crossbars 11 has a free end, an external surface, a fixing hole 111, a mounting hole 112, and a pressing bolt 113. The free end of the crossbar 11 extends outwardly from the corresponding sidewall of the mounting stud 52. The fixing hole 111 is formed in the free end of the crossbar 11. The mounting hole 112 is radially formed through the external surface of the crossbar 11 near the free end of the crossbar 11, and communicates with the fixing hole 111. The pressing bolt 113 is securely mounted in the fixing hole 111, and has a pressing end extending in the mounting hole 112 of the crossbar 11. In addition, the mounting holes 112 of the crossbars 11 align with each other.

The bridge bar 12 is connected to the crossbars 11, is parallel with the corresponding sidewall of the mounting stud 52, and has an external surface, a top end, a bottom end, an outer thread 121, and a pressing face 122. The bridge bar 12 is mounted through the mounting holes 112 of the crossbars 11, and the top end and the bottom end of the bridge bar 12 respectively extend out of the external surfaces of the crossbars 11. The outer thread 121 is formed around the external surface of the bridge bar 12. The pressing face 122 is flat, is axially formed on the external surface of the bridge bar 12 from the top end to the bottom end of the bridge bar 12, and is opposite to the corresponding sidewall of the mounting stud 52. In addition, with reference to FIG. 4, the pressing ends of the pressing bolts 113 are pressed against the pressing face 122 of the bridge bar 12 to hold the bridge bar 12 securely with the crossbars 11.

The positioning group 20 is adjustably connected to the mounting group 10, and has a bottom limiting block 21, a top limiting block 22, a holding frame 23, and a circuit breaker 24.

The bottom limiting block 21 is adjustably connected to the bridge bar 12 between the crossbars 11, and has a limiting bolt 211 and a rotating button 212. The limiting bolt 211 is mounted around and screwed with the bridge bar 12, and has an external surface, a threaded hole 213, and a button hole 214. The threaded hole 213 is formed through the limiting bolt 211, is securely disposed around the bridge bar 12, and is screwed with the outer thread 121 of the bridge bar 12. The button hole 214 is radially formed through the external surface of the limiting bolt 211 and communicates with the threaded hole 213. The rotating button 212 is securely connected to the limiting bolt 211, is pressed against the bridge bar 12, and has an abutting end. The abutting end of the rotating button 212 is screwed with the button hole 214, extends into the threaded hole 213, and is pressed against the pressing face 122 of the bridge bar 12. Then, the bottom limiting block 21 is securely mounted on the bridge bar 12 between the crossbars 11.

The top limiting block 22 is adjustably connected to the bridge bar 12 between the bottom limiting block 21 and one of the crossbars 11, and has a limiting bolt 221 and a rotating button 222. The limiting bolt 221 is mounted around and screwed with the bridge bar 12 above the limiting bolt 211 of the bottom limiting block 21, and has an external surface, a threaded hole 223, and a button hole 224. The threaded hole 223 is formed through the limiting bolt 221, is securely disposed around the bridge bar 12 and is screwed with the outer thread 121 of the bridge bar 12. The button hole 224 is radially formed through the external surface of the limiting bolt 221 and communicates with the threaded hole 223. The rotating button 222 is securely connected to the limiting bolt 221, is pressed against the bridge bar 12, and has an abutting end. The abutting end of the rotating button 222 is screwed with the button hole 224, extends into the threaded hole 223, and is pressed against the pressing face 122 of the bridge bar 12. Then, the top limiting block 22 is securely mounted on the bridge bar 12 between the bottom limiting block 21 and the corresponding crossbar 11.

The holding frame 23 is a hollow and U-shaped frame, is securely connected to the limiting bolt 221 of the top limiting block 22, and has an inner end, an outer end, a sidewall, an open bottom, a receiving chamber, and at least one elongated hole 231. The sidewall of the holding frame 23 is securely connected to the external surface of the limiting bolt 211 near the inner end of the holding frame 23. Preferably, the holding frame 23 is securely connected to the top limiting block 22 by welding. The receiving chamber is formed in the holding frame 23 and communicates with the open bottom of the holding frame 23. The at least one elongated hole 231 is formed through the sidewall of the holding frame 23 and communicates with the receiving chamber of the holding frame 23. Preferably, the holding frame 23 has two elongated holes 231 formed through the sidewall of the holding frame 23 and communicating with the receiving chamber of the holding frame 23.

The circuit breaker 24 is securely mounted in the receiving chamber of the holding frame 23 via the open bottom of the holding frame 23, and has a bottom, an outer end, a contacting slice 241, and an electric wire 242. The contacting slice 241 may be L-shaped, is elastically connected to the bottom of the circuit breaker 24, transversally extends out of the open bottom of the holding frame 23, and has a contacting end and a bottom face. The contacting end of the contacting slice 241 extends adjacent to the bridge bar 12 between the limiting blots 211, 221 of the limiting blocks 21, 22. The electric wire 242 is connected to the outer end of the circuit breaker 24, extends out of the outer end of the holding frame 23, and is electrically connected to the motor 55. Preferably, the circuit breaker 24 has at least one connecting bolt 243 mounted through the at least one elongated hole 231 of the holding frame 23 and connected to the circuit breaker 24 to hold the circuit breaker 24 securely in the holding frame 23. In addition, the circuit breaker 24 has two connecting bolts 243 respectively mounted through the two elongated holes 231 of the holding frame 23 and connected to the circuit breaker 24.

The retaining arm 30 is securely connected to one of the opposite sides of the moving head 53 that is opposite to the operating lever 56, movably extends along the sidewall of the mounting stud 52 that is connected to the crossbars 11 between the limiting bolts 211, 221 of the limiting blocks 21, 22, and selectively abuts the contacting slice 241 of the circuit breaker 24. The retaining arm 30 may be L-shaped and has a proximal end and a distal end. The proximal end of the retaining arm 30 is securely connected to the corresponding opposite side of the moving head 53. The distal end of the retaining arm 30 extends backwardly along the corresponding sidewall of the mounting stud 52, and is selectively pressed against the bottom face of the contacting slice 241 to enable the circuit breaker 24 at a turn-off condition. Then, the motor 55 cannot drive the at least one drill 541 of the drill seat 54 to rotate relative to the base 51.

Figure 4:
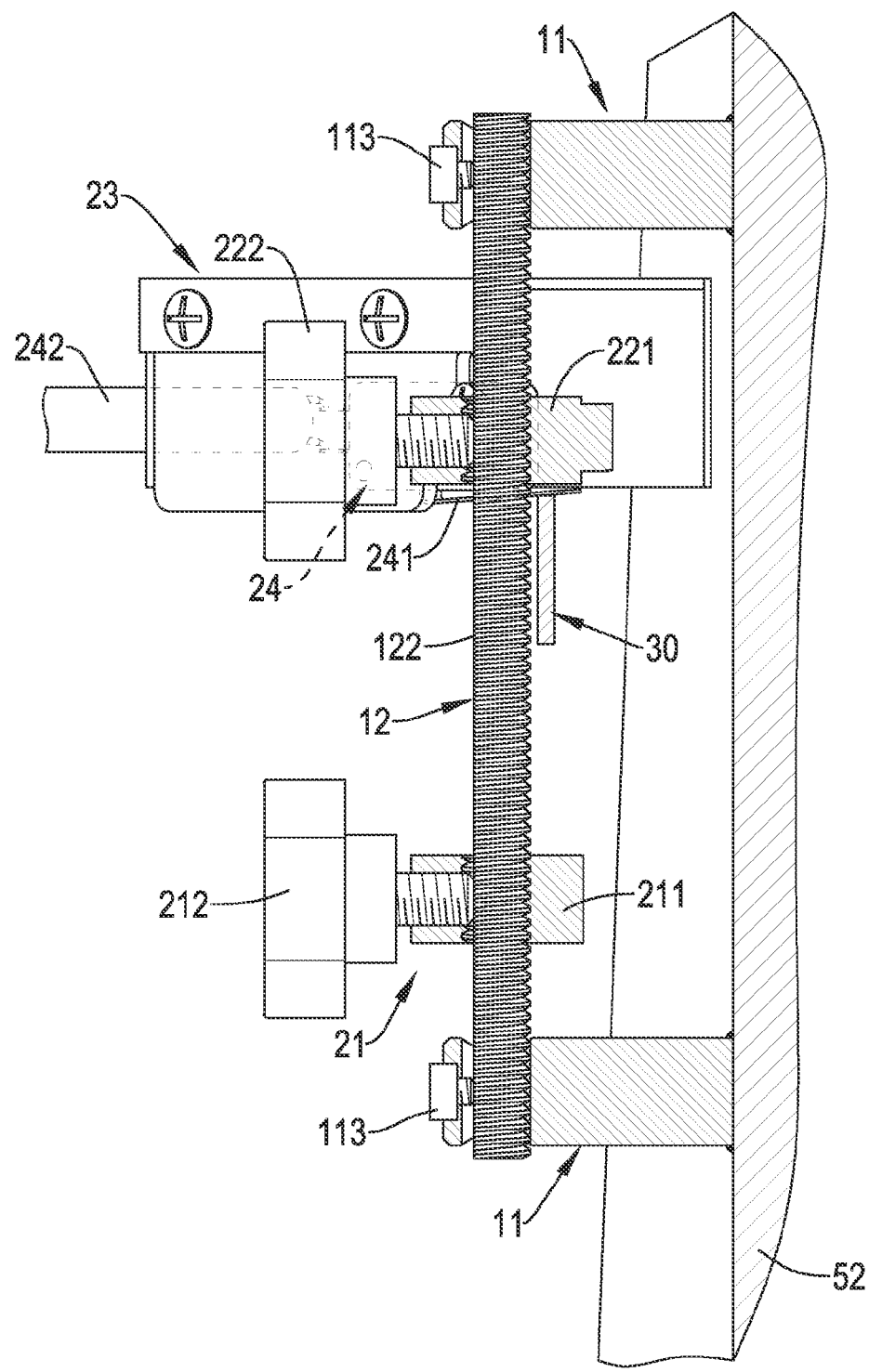
FIG. 4 is an enlarged and partial cross-sectional front side view of the position controlling device in FIG. 1.
Figure 5:
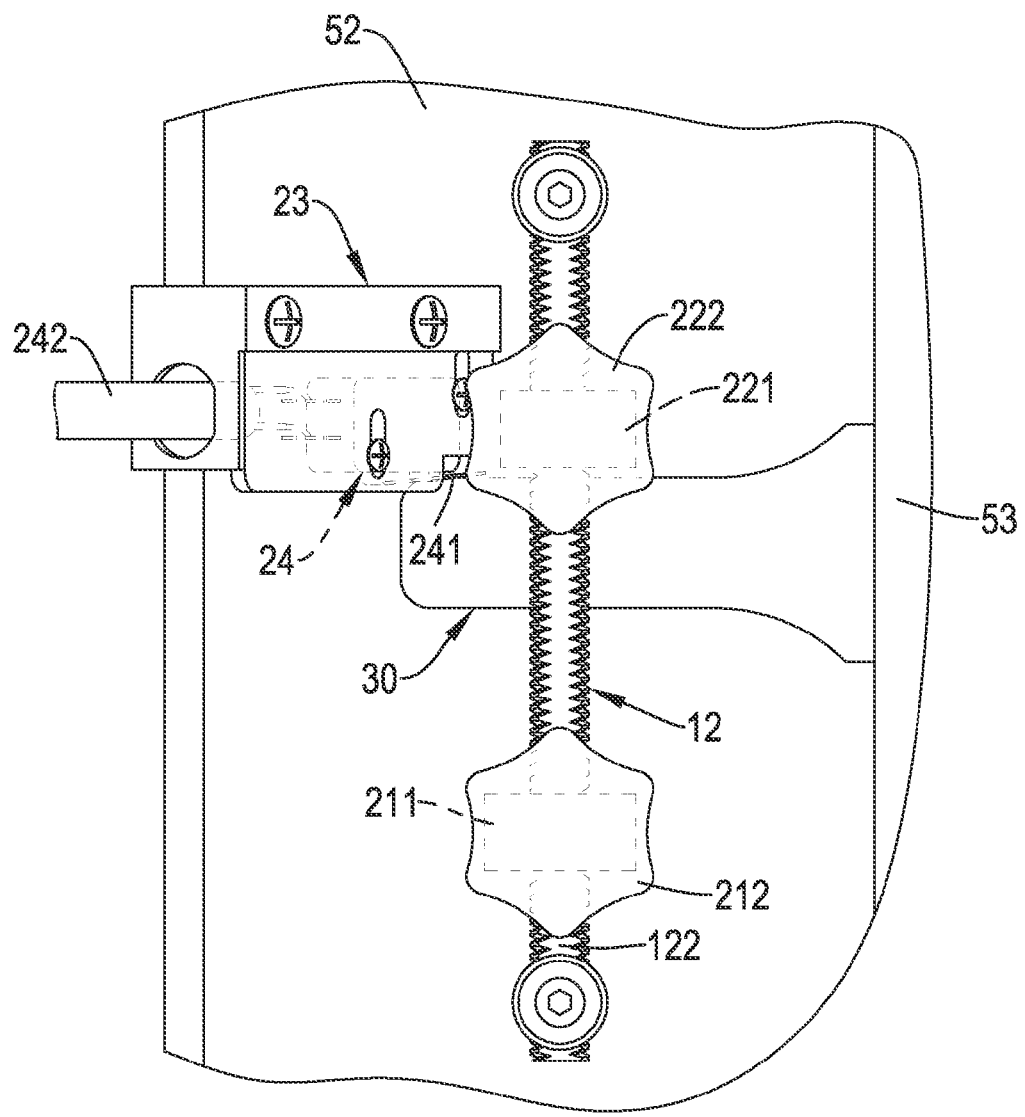
FIG. 5 is an enlarged side view of the position controlling device in FIG. 1.

In use, with reference to FIGS. 1, 4, and 5, before the operating lever 56 is rotated, the retaining arm 30 is moved with the moving head 53 and is pressed against the contacting slice 241 of the circuit breaker 24 to enable the circuit breaker 24 at a turn-off condition, and the at least one drill 541 is not rotated relative to the top face 511 of the base 11.

Figure 6:
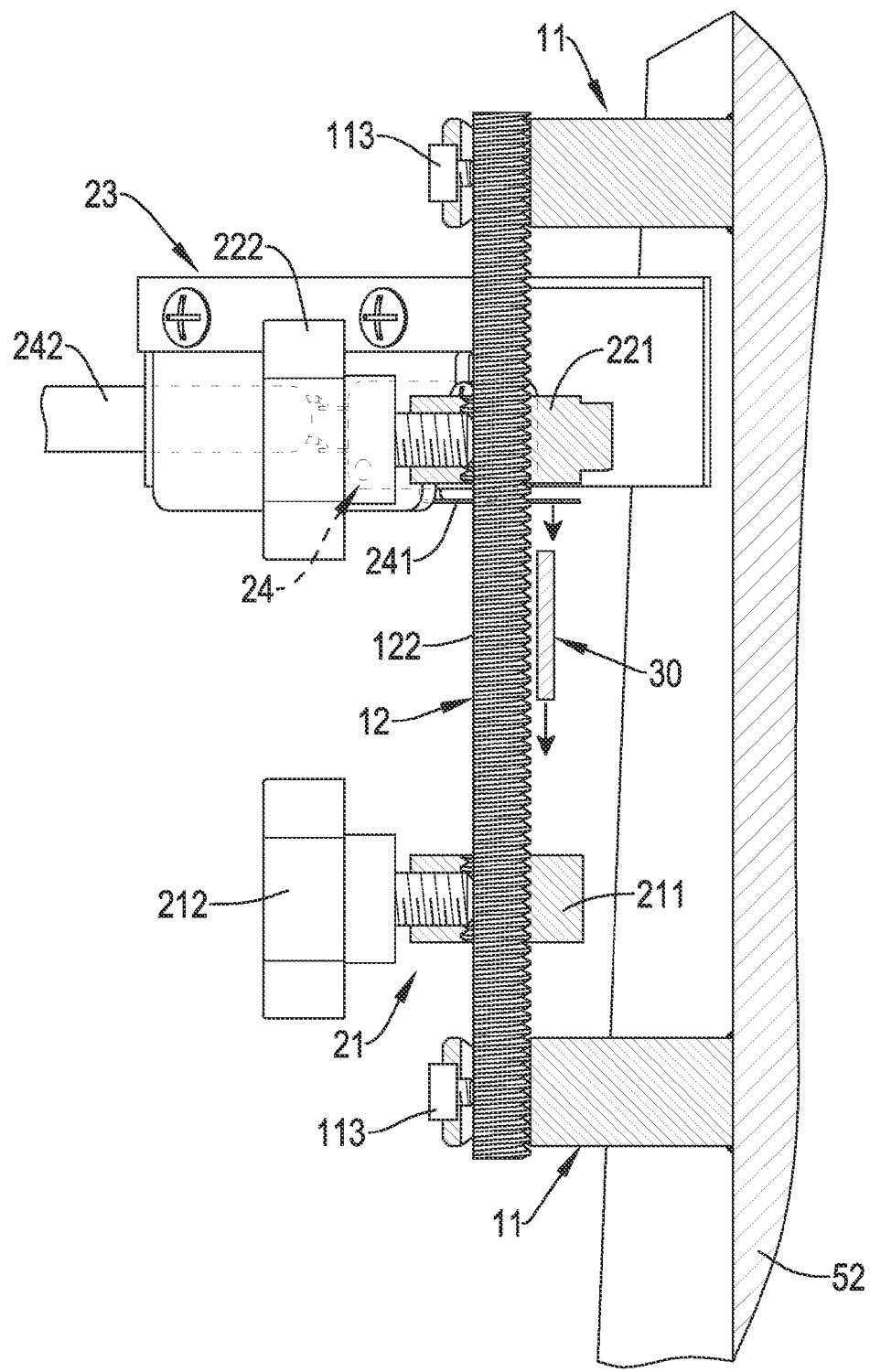
FIG. 6 is an operational and partial cross-sectional front side view of the position controlling device in FIG. 4.
Figure 7:
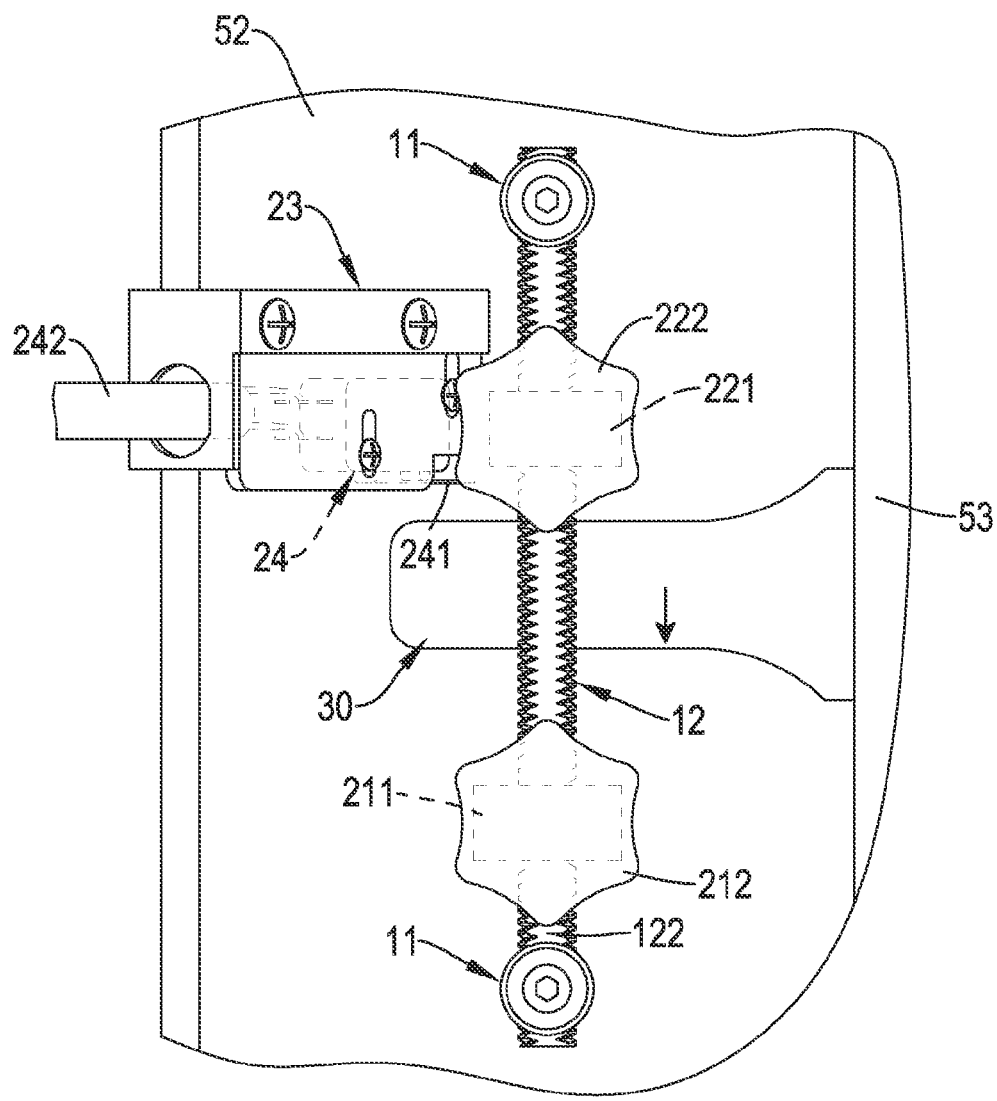
FIG. 7 is an operational side view of the position controlling device in FIG. 5.

With reference to FIGS. 1, 6, and 7, a work piece is securely held on the top face 511 of the base 51 below the at least one drill 541, and a user rotates the operating lever 56 relative to the mounting stud 52, the moving head 53 is moved downwardly relative to the mounting stud 52 to enable the at least one drill 541 to move closer to the working piece. When the retaining arm 30 is moved with the moving head 53 to enable the distal end of the retaining arm 30 to separate from the contacting slice 241 of the circuit breaker 24, the contacting slice 241 is deformed and is separated from the bottom of the circuit breaker 24. Then, the circuit breaker 24 has become in a turn-on condition, and the motor 55 can drive the at least one drill 541 of the drill seat 54. Therefore, during a down stroke of the at least one drill 541, the at least one drill 541 is driven by the motor 55 to drill the working piece.

Figure 8:
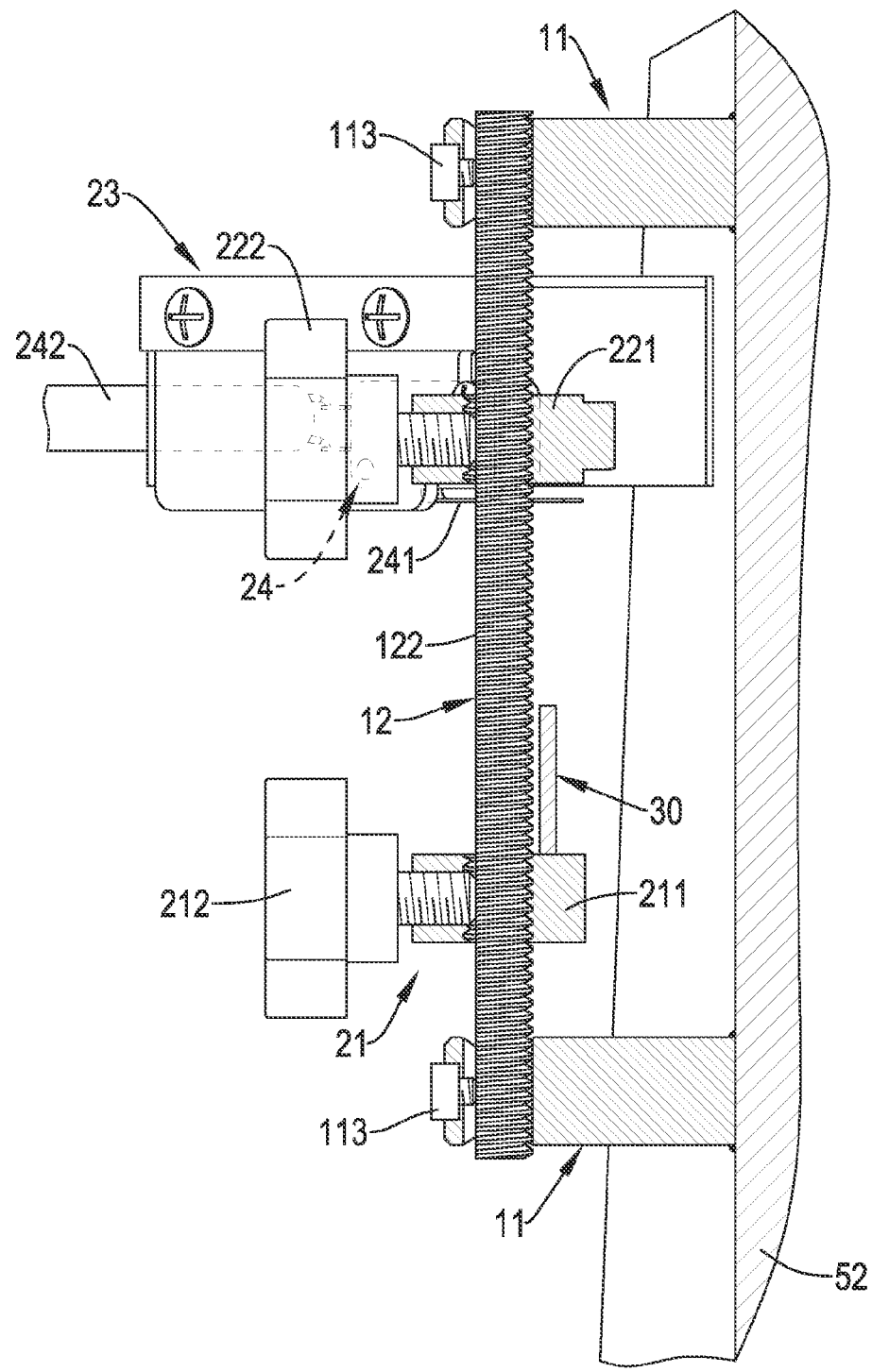
FIG. 8 is another operational and partial cross-sectional front side view of the position controlling device in FIG. 1.

In addition, with reference to FIG. 8, when the user continuously rotates the operating lever 56, the at least one drill 541 is moved downwardly with the moving head 53 to drill the working piece until the distal end of the retaining arm 30 is pressed against the limiting blot 211 of the bottom limiting block 21. After drilling the working piece, the operating lever 56 is turned around to the original position, and this will enable the at least one drill 541 to move upwardly with the moving head 53 relative to the working piece.

When the at least one drill 541 is continuously moved upward with the moving head 53 toward the limiting bolt 221 of the top limiting block 22 to enable the distal end of the retaining arm 30 to press against the contacting slice 241 of the circuit breaker 24 as shown in FIGS. 4 and 5, the circuit breaker 24 will be in a turn-off condition. Then, the at least one drill 541 cannot be driven by the motor 55, and this can prevent the user or other persons from getting injured when completing the drilling operation, and this is safe in use and also can reduce energy waste.

Furthermore, with reference to FIGS. 3 and 4, the limiting bolts 211, 221 are screwed with the outer thread 121 of the bridge bar 12, and the abutting ends of the rotating buttons 212 are pressed against the pressing face 122 of the bridge bar 12, and the above-mentioned structural relationships between the bridge bar 12 and the limiting blocks 21, 22 can increase the bonding strength between the bridge bar 12 and the limiting blocks 21, 22. Then, when the retaining arm 30 is moved with the moving head 53 to hit against the limiting bolts 211, 221 during the drilling operation, the positions of the limiting bolts 211, 221 will not be changed by the retaining arm 30, and the stroke of the at least one drill 541 will also not be changed and this can provide a preferred processing quality to the carpenter angle drill/hollow chisel mortiser.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A position controlling device for a carpenter angle drill/hollow chisel mortiser having a mounting stud with a sidewall, a moving head slidably mounted on the mounting stud and having a side, a drill seat securely mounted on the moving head and having at least one drill, and a motor securely mounted on the drill seat behind the moving head to drive the at least one drill, and the position controlling device having:

a mounting group being adapted to securely mount on the sidewall of the mounting stud, and having
two crossbars being adapted to transversally and securely mount on and extend from the sidewall of the mounting stud at an interval, and each one of the crossbars having
a free end being adapted to extend outwardly from the sidewall of the mounting stud;
an external surface; and
a mounting hole radially formed through the external surface of the crossbar near the free end of the crossbar, and the mounting holes of the two crossbars aligning with each other; and
a bridge bar connected to the crossbars, mounted through the mounting holes of the crossbars, being adapted to be parallel with the sidewall of the mounting stud, and having
an external surface;
a top end extending out of the external surface of one of the crossbars; and
a bottom end extending out of the external surface of the other crossbar;
a positioning group adjustably connected to the mounting group, and having
a bottom limiting block adjustably connected to the bridge bar between the crossbars, and having
a limiting bolt securely mounted around the bridge bar; and
a rotating button securely connected to the limiting bolt, and having an abutting end pressed against the external surface of the bridge bar via the limiting bolt;
a top limiting block adjustably connected to the bridge bar between the bottom limiting block and one of the crossbars, and having
a limiting bolt securely mounted around the bridge bar above the limiting bolt of the bottom limiting block, and having an external surface; and a rotating button securely connected to the limiting bolt of the top limiting block, having an abutting end pressed against the external surface of the bridge bar via the limiting bolt of the top limiting block;

a holding frame securely connected to the limiting bolt of the top limiting block, and having
an inner end;
an outer end;
a sidewall securely connected to the external surface of the limiting bolt of the top limiting block near the inner end of the holding frame;
an open bottom; and
a receiving chamber formed in the holding frame and communicating with the open bottom of the holding frame; and a circuit breaker securely mounted in the receiving chamber of the holding frame via the open bottom of the holding frame, and having
a bottom;
an outer end;
a contacting slice elastically connected to the bottom of the circuit breaker, transversely extending out of the open bottom of the holding frame, and having
a contacting end extending adjacent to the bridge bar between the limiting blots of the limiting blocks; and
a bottom face; and
an electric wire connected to the outer end of the circuit breaker, extending out of the outer end of the holding frame, and being adapted to electrically connect to the motor; and a retaining arm being adapted to securely connect to the side of the moving head, movably extending along the sidewall of the mounting stud between the limiting bolts of the limiting blocks, selectively abutting the contacting slice of the circuit breaker, and having
a proximal end being adapted to securely connect to the side of the moving head; and
a distal end extending along the sidewall of the mounting stud, and selectively pressed against the bottom face of the contacting slice to enable the circuit breaker at a turn-off condition.

2. The position controlling device as claimed in claim 1, wherein
the bridge bar has a pressing face being flat, axially formed on the external surface of the bridge bar from the top end to the bottom end of the bridge bar, and being opposite to the sidewall of the mounting stud;
the limiting bolt of the bottom limiting block has
an external surface;
a threaded hole formed through the limiting bolt, securely disposed around the bridge bar and screwed with the bridge bar; and
a button hole radially formed through the external surface of the limiting bolt of the bottom limiting block and communicating with the threaded hole of the limiting bolt of the bottom limiting block;
the limiting blot of the top limiting block has
a threaded hole formed through the limiting bolt, securely disposed around the bridge bar and screwed with the outer thread of the bridge bar; and
a button hole radially formed through the external surface of the limiting bolt of the top limiting block and communicating with the threaded hole of the limiting bolt of the top limiting block;

the rotating button of the bottom limiting block has an abutting end screwed with the button hole of the limiting blot of the bottom limiting block, extending into the threaded hole of the limiting blot of the bottom limiting block, and pressed against the pressing face of the bridge bar to hold the bottom limiting block securely on the bridge bar between the crossbars; and
the rotating button of the top limiting block has an abutting end screwed with the button hole of the limiting blot of the top limiting block, extending into the threaded hole of the limiting blot of the top limiting block, and pressed against the pressing face of the bridge bar to hold the top limiting block securely on the bridge bar between the bottom limiting block and the corresponding crossbar.

3. The position controlling device as claimed in claim 2, wherein
the bridge bar has an outer thread formed around the external surface of the bridge bar beside the pressing face; and
each one of the crossbars has
a fixing hole formed in the free end of the crossbar and communicating with the mounting hole; and
a pressing bolt securely mounted in the fixing hole, and having a pressing end extending in the mounting hole of the crossbar to press against the pressing face of the bridge bar to hold the bridge bar securely with the crossbars.

4. The position controlling device as claimed in claim 3, wherein
the holding frame has at least one elongated hole formed through the sidewall of the holding frame and communicating with the receiving chamber of the holding frame; and
the circuit breaker has at least one connecting bolt mounted through the at least one elongated hole of the holding frame and connected to the circuit breaker to hold the circuit breaker securely in the holding frame.

5. The position controlling device as claimed in claim 1, wherein
the bridge bar has an outer thread formed around the external surface of the bridge bar; and
each one of the crossbars has
a fixing hole formed in the free end of the crossbar and communicating with the mounting hole; and
a pressing bolt securely mounted in the fixing hole, and having a pressing end extending in the mounting hole of the crossbar to press against the pressing face of the bridge bar to hold the bridge bar securely with the crossbars.

6. The position controlling device as claimed in claim 1, wherein
the holding frame has at least one elongated hole formed through the sidewall of the holding frame and communicating with the receiving chamber of the holding frame; and
the circuit breaker has at least one connecting bolt mounted through the at least one elongated hole of the holding frame and connected to the circuit breaker to hold the circuit breaker securely in the holding frame.

7. The position controlling device as claimed in claim 2, wherein
the holding frame has at least one elongated hole formed through the sidewall of the holding frame and communicating with the receiving chamber of the holding frame; and the circuit breaker has at least one connecting bolt mounted through the at least one elongated hole of the holding frame and connected to the circuit breaker to hold the circuit breaker securely in the holding frame.

* * * * *